(12) United States Patent
Oster et al.

(10) Patent No.: US 10,816,733 B2
(45) Date of Patent: Oct. 27, 2020

(54) PIEZOELECTRICALLY ACTUATED MIRRORS FOR OPTICAL COMMUNICATIONS

(71) Applicant: Intel Corporation, Santa Clara, CA (US)

(72) Inventors: Sasha N. Oster, Marion, IA (US); Johanna M. Swan, Scottsdale, AZ (US); Feras Eid, Chandler, AZ (US); Thomas L. Sounart, Chandler, AZ (US); Aleksandar Aleksov, Chandler, AZ (US); Shawna M. Liff, Scottsdale, AZ (US); Baris Bicen, Chandler, AZ (US); Valluri R. Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 16/072,240

(22) PCT Filed: Apr. 1, 2016

(86) PCT No.: PCT/US2016/025760
§ 371 (c)(1),
(2) Date: Jul. 24, 2018

(87) PCT Pub. No.: WO2017/171882
PCT Pub. Date: Oct. 5, 2017

(65) Prior Publication Data
US 2020/0064555 A1 Feb. 27, 2020

(51) Int. Cl.
*G02B 6/35* (2006.01)
*H04Q 11/00* (2006.01)
(Continued)

(52) U.S. Cl.
CPC .......... *G02B 6/3518* (2013.01); *G02B 26/08* (2013.01); *G02B 26/0858* (2013.01);
(Continued)

(58) Field of Classification Search
CPC .. G02B 6/3518; G02B 26/08; G02B 26/0858; H04B 10/2504; H04Q 11/0005;
(Continued)

(56) References Cited

U.S. PATENT DOCUMENTS

| 5,208,880 A | 5/1993 | Riza et al. |
| 5,481,396 A * | 1/1996 | Ji .......................... B81B 3/004 |
| | | 359/224.1 |

(Continued)

FOREIGN PATENT DOCUMENTS

| JP | 03215812 A * | 9/1991 | |
| JP | 2001056441 A * | 2/2001 | ............. G02B 26/08 |

(Continued)

OTHER PUBLICATIONS

International Search Report and Written Opinion for International Patent Application No. PCT/US2016/025760 dated Nov. 15, 2016, 16pgs.

(Continued)

*Primary Examiner* — Daniel Petkovsek
(74) *Attorney, Agent, or Firm* — Schwabe, Williamson & Wyatt, P.C.

(57) ABSTRACT

Embodiments of the invention include an optical routing device that includes an organic substrate. According to an embodiment, an array of cavities are formed into the organic substrate and an array of piezoelectrically actuated mirrors may be anchored to the organic substrate with each piezoelectrically actuated mirror extending over a cavity. In order to properly rout incoming optical signals, the optical routing device may also include a routing die mounted on the (Continued)

organic substrate. The routing die may be electrically coupled to each of the piezoelectrically actuated mirrors and is able to generated a voltage across the first and second electrodes of each piezoelectrically actuated mirror. Additionally, a photodetector may be electrically coupled to the routing die. According to an embodiment, an array of fiber optic cables may be optically coupled with one of the piezoelectrically actuated mirrors and optically coupled with the photodetector.

19 Claims, 11 Drawing Sheets

(51) Int. Cl.
    *G02B 26/08* (2006.01)
    *H04B 10/25* (2013.01)
(52) U.S. Cl.
    CPC ... *H04Q 11/0005* (2013.01); *H04B 10/25891* (2020.05); *H04Q 2011/003* (2013.01); *H04Q 2011/0026* (2013.01); *H04Q 2011/0039* (2013.01)
(58) Field of Classification Search
    CPC ..... H04Q 2011/0026; H04Q 2011/003; H04Q 2011/0039
    See application file for complete search history.

(56) References Cited

U.S. PATENT DOCUMENTS

| | | | | |
|---|---|---|---|---|
| 5,661,611 | A * | 8/1997 | Kim | G02B 26/0858 359/871 |
| 6,681,063 | B1 * | 1/2004 | Kane | G02B 6/3578 359/224.1 |
| 8,279,508 | B2 * | 10/2012 | Nakazono | G02B 26/0858 359/199.1 |
| 2002/0054729 | A1 | 5/2002 | Bert et al. | |
| 2002/0149834 | A1 * | 10/2002 | Mei | G02B 6/3512 359/295 |
| 2006/0133724 | A1 | 6/2006 | Huang et al. | |
| 2006/0152830 | A1 | 7/2006 | Farah | |
| 2019/0025573 | A1 * | 1/2019 | Aleksov | G02B 26/101 |

FOREIGN PATENT DOCUMENTS

| | | | |
|---|---|---|---|
| JP | 2001100119 A * | 4/2001 | ............. G02B 26/08 |
| WO | WO-01-63330 | 8/2001 | |

OTHER PUBLICATIONS

International Preliminary Report on Patentability for International Patent Application No. PCT/US2016/025760, dated Oct. 11, 2018, 13 pages.

* cited by examiner

PIEZOELECTRICALLY ACTUATED MIRRORS FOR OPTICAL COMMUNICATIONS

CROSS-REFERENCE TO RELATED APPLICATION

This patent application is a U.S. National Phase Application under 35 U.S.C. § 371 of International Application No. PCT/US2016/025760, filed Apr. 1, 2016, entitled "PIEZO-ELECTRICALLY ACTUATED MIRRORS FOR OPTICAL COMMUNICATIONS," which designates the United States of America, the entire disclosure of which is hereby incorporated by reference in its entirety and for all purposes.

FIELD OF THE INVENTION

Embodiments of the present invention relate generally to the manufacture of piezoelectric mirrors on organic substrates. In particular, embodiments of the present invention relate to piezoelectric mirrors that are used in optical switches and methods for manufacturing such devices.

BACKGROUND OF THE INVENTION

The backbone of current global telecommunications network is fiber optic communications. In fiber optic communication networks, packets are generated in the electrical domain, converted to the optical domain for long haul transmission, switched back to the electrical domain for routing, switched back to the optical domain for transmission, and finally, switched back to the electrical domain near the final destination. The intermediate optical-electrical-optical conversion for routing is referred to as an OEO conversion and must occur at each router along the packet's path. Attempts to eliminate the OEO conversion have received significant attention since the OEO conversion is considered to be a major bottleneck in current fiber optic networks. Additionally, the OEO conversion is power intensive, since an electrical signal needs to be converted to an optical signal.

One approach to removing the OEO conversion is by using an optical routing device. Optical switching that is currently available relies on silicon based micro-electromechanical systems (MEMS). For example, micromirrors that employ electrostatic, piezoelectric, or magnetic actuation can be fabricated using silicon MEMS techniques. However, silicon-based MEMS devices suffer significant drawbacks. One drawback is that silicon substrates and the processing operations used to form MEMS devices are relatively expensive, compared to other electronics fabrication materials and processes, such as organic substrates used for packaging or board manufacturing. Additionally, silicon MEMS are often fabricated at wafer level. Therefore, fabrication of micromirrors on silicon cannot take advantage of scaling to larger substrates due to the limitation on wafer sizes (e.g., 4" or 6"). Furthermore, after silicon-based MEMS mirror devices are fabricated, they still need to be packaged and then assembled into their final system. Therefore, MEMs mirrors today suffer from high cost, assembly challenges, and larger overall size.

With respect to piezoelectrically actuated mirrors, it is not currently possibly to replace semiconductor fabrication with low-temperature materials, such as organic substrates. Piezoelectric systems are limited to being formed on high-temperature compatible substrates because an annealing process is needed to crystalize the piezoelectric layer. Typically, the annealing temperatures are in excess of 500° C. As such, low-temperature substrates, such as organic substrates, cannot currently be used to form piezoelectric systems because the elevated temperatures may melt or otherwise damage the substrate.

DETAILED DESCRIPTION OF THE INVENTION

Figure 1A:
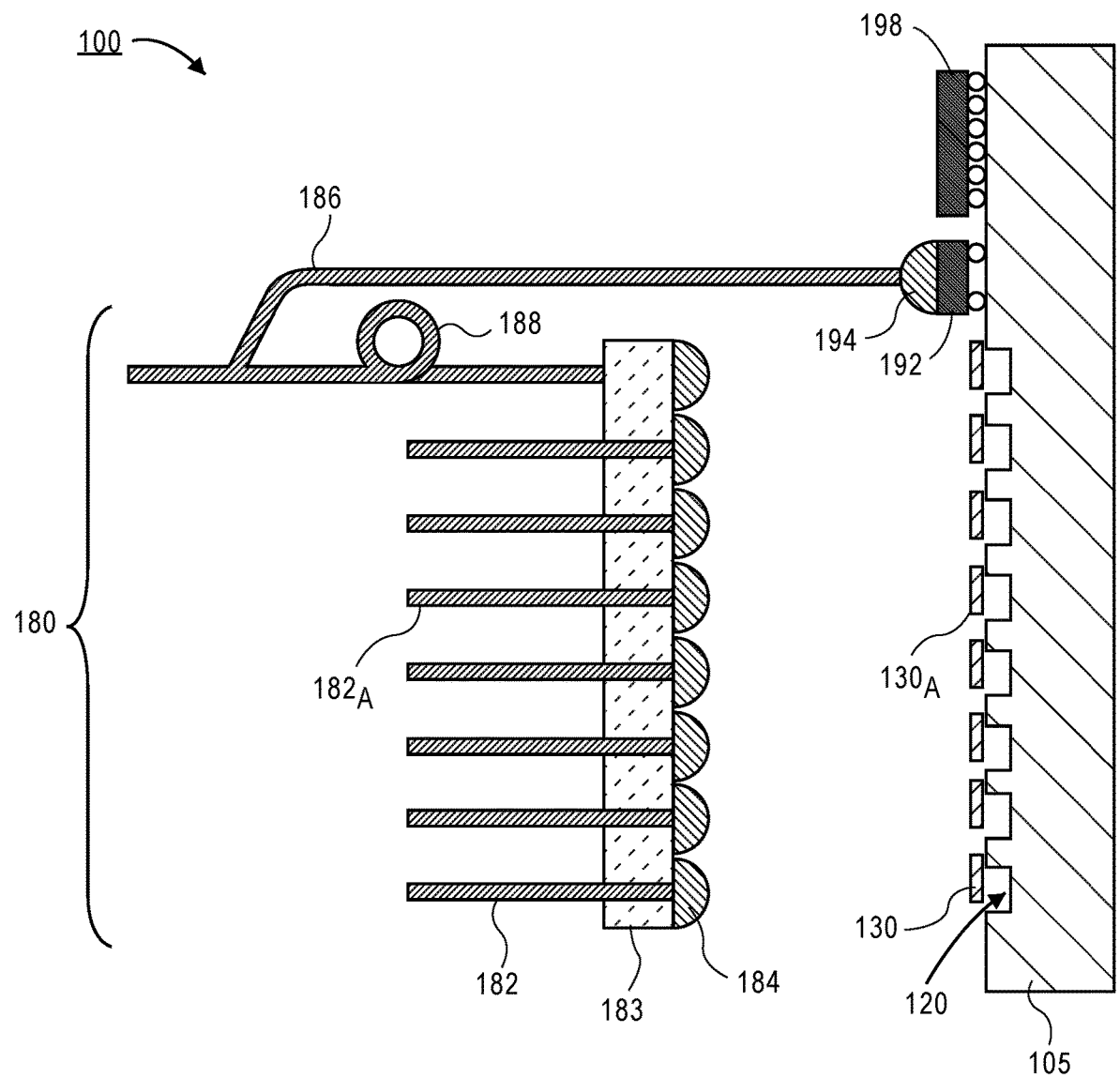
FIG. 1A is a cross-sectional illustration of an optical router that includes piezoelectric mirrors formed on an organic substrate, according to an embodiment of the invention.

Described herein are systems that include an optical routing device that includes piezoelectrically actuated mirrors formed on an organic substrate and methods of forming such optical routing devices. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

Embodiments of the invention allow for optical routing in fiber optic networks. Accordingly, the bottleneck described above due to the OEO conversion may be substantially eliminated. Furthermore, embodiments of the invention include piezoelectrically driven mirrors that are fabricated on organic substrates. As such, the issues of high cost and limited scaling described above with respect to silicon-based MEMS devices are avoided.

Manufacturing piezoelectrically actuated mirrors on organic substrates allows for a decrease in the manufacturing cost. For example technologies and materials developed for package/board processing are significantly less expensive than technologies and materials used for semiconductor processing. Fabricating steerable mirrors directly in the substrate or board reduces the cost over silicon MEMS because of the large panel (e.g., 510 mm×515 mm) used for organic substrate and board fabrication, the less expensive processing operations, and the less expensive materials used in those systems compared to silicon MEMS. In addition, since the mirrors are directly manufactured as part of the package substrate or board, they do not require an additional assembly operation.

Due to these benefits, large numbers of mirrors may be integrated into a single system more cost-effectively than would be possible with silicon MEMS approaches. Accordingly, large arrays of steerable mirrors may be fabricated on a single organic substrate to provide increased switching capacity. For example, currently available routing technologies may include between 526 and 1162 mirrors, while embodiments of the present invention may include more mirrors, and may be limited by only the area the mirrors occupy (i.e., size and cost considerations). Additionally, the overall thickness is very small (e.g., in the tens of micrometers) since additional packaging needed for silicon MEMS devices is not required.

Referring now to FIG. 1A, a cross-sectional illustration of a portion of an optical router 100 is shown, according to an embodiment of the invention. The optical router 100 may include an array of input/output ports 180. According to an embodiment, the array of input/output ports 180 may include a plurality of fiber optic cables 182. The fiber optic cables 182 allow for optical signals (e.g., packets) to be transmitted across a network. According to an embodiment, the transmission of the optical signal can be any transmission type (e.g., bi-directional, multi-wavelength, etc.), and each fiber optic cable 182 may function as an input and/or an output port, depending on the needs of the device. Each fiber optic cable 182 may also include a lens 184 for focusing the optical signal coming into or out of each fiber optic cable 182.

In an embodiment, a mounting structure 183 may be used to secure each of the fiber optic cables 182. The mounting structure 183 may be positioned so that each fiber optic cable 182 is optically coupled with a piezoelectrically actuated mirror 130 formed on an organic substrate 105. As used herein, optically coupled refers to an optical signal being able to be transmitted from a first location to a second location. For example, fiber optic cable $182_A$ is optically coupled with piezoelectrically actuated mirror $130_A$. As such, an optical signal transmitted out of fiber optic cable $182_A$ through the lens 184 will be reflected by piezoelectrically actuated mirror $130_A$. When the piezoelectrically actuate mirror $130_A$ is not being actuated (e.g., the piezoelectrically actuated mirror $130_A$ is substantially parallel to a surface of the organic substrate 105), the optical signal may be reflected back into the fiber optic cable $182_A$. Additionally, when the piezoelectrically actuated mirror $130_A$ is actuated, the optical signal may be routed to a different fiber optic cable 182, as will be described in greater detail below.

According to an embodiment, the optical router 100 may include an optical to electrical conversion system that is used to control the piezoelectrically actuated mirrors 130 in order properly rout optical signals. For example, the optical to electrical conversion system may read header information from each packet to determine where the packet should be routed. In an embodiment, the header information from a packet is obtained by an optical splitter that removes a portion of the power from signals transmitted over each fiber optic cable and directs it along an optical fiber 186 to a photodetector 192 mounted on the organic substrate 105. In the illustrated embodiment, a single optical split is shown on the uppermost fiber optic cable 182 in order to not unnecessarily obscure the Figure, though it is to be appreciated that each of the fiber optic cables 182 may include an optical splitter. The optical splitter may remove a small portion of the power from the optical signal (e.g., approximately 1% of the power) and deliver the packet to the photodetector 192 over the optical fiber 186. In an embodiment, the photodetector 192 may include a lens 194 for focusing the optical signal. The photodetector 192 may be any suitable device for converting an optical signal into an electrical signal. For example, the photodetector 192 may be a photodiode.

After the optical signal has been converted to an electrical signal by the photodetector 192, the electrical signal may be transmitted to a routing die 198 that is mounted to the organic substrate 105. In an embodiment, the electrical signal may be transmitted from the photodetector 192 to the routing die 198 by conductive traces (not shown) formed on or in the organic substrate 105. The routing die 198 may include circuitry for processing the electrical signal to determine where the packet should be routed. For example, the routing die may use the header information to determine which optical fiber 182 the packet is currently being transmitted over and to which optical fiber 182 that the packet needs to be routed. Accordingly, the routing die 198 can determine which piezoelectrically actuated mirror 130 needs to be actuated and to what angle the piezoelectrically actuated mirror 130 should be held at to properly route the incoming packet. The routing die 198 may then deliver an actuation signal to the proper mirror 130 that causes the mirror 130 to be actuated at an angle that will reflect the optical signal to the desired fiber optic cable 182. For example, in a piezoelectrically actuated mirror 130, the actuation signal may be a voltage that is applied to electrodes formed on opposing surfaces of a piezoelectric material, as will be described in greater detail below.

According to an embodiment, the fiber optic cable 182 may also include an optical delay 188 that is formed between the optical splitter and the lens 184. The optical delay 188 increases the distance that the optical signal needs to travel after the splitter in order to provide time for the routing die 198 to process the switching instructions and deliver the routing signal to the proper piezoelectrically actuated mirror 130. In the illustrated embodiment, the optical delay 188 is illustrated as a loop, but embodiments are not limited to such configurations. For example, the optical delay may be any additional length of fiber that increases the path length between the splitter and the piezoelectrically actuated mirror 130.

Figure 1B:
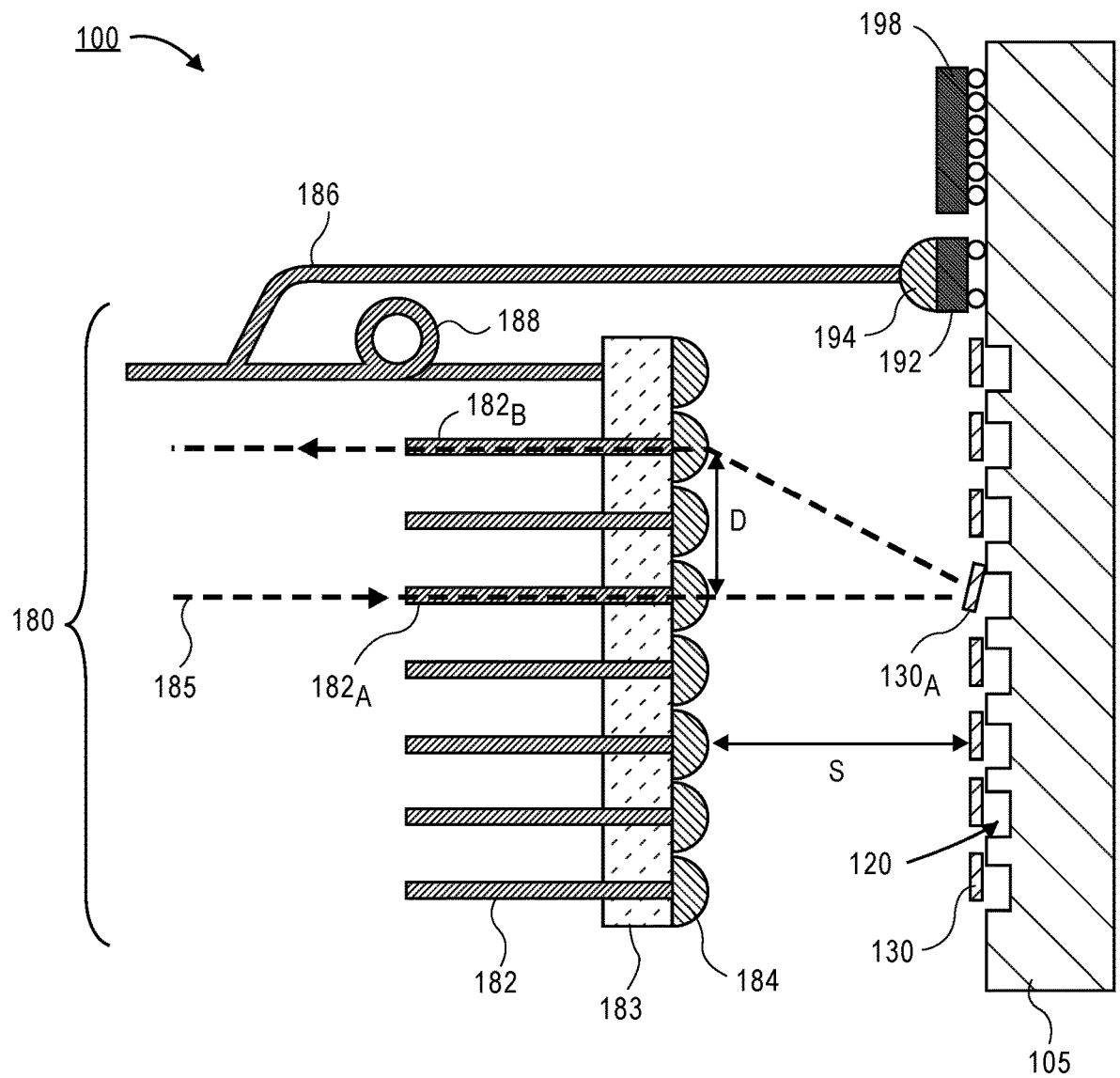
FIG. 1B is a cross-sectional illustration of the optical router in FIG. 1A with one of the piezoelectric mirrors actuated for switching an optical signal, according to an embodiment of the invention.

Referring now to FIG. 1B, a cross-sectional illustration of an example of an optical signal 185 being switched from a first fiber optic cable 182$_A$ to a second fiber optic cable 182$_B$ with an optical routing system 100 is shown, according to an embodiment of the invention. As illustrated, the optical signal 185 is originally being transmitted along fiber optic cable 182$_A$. Though a splitter is not illustrated on fiber optic cable 182$_A$ it is to be appreciated that a portion of the optical signal 185 may be transmitted along optical fiber 186 to the photodetector 192 and ultimately to the routing die 198. According to an embodiment, the header information from the optical signal 185 may instruct the routing die 198 to switch the optical signal 185 to fiber optic cable 182$_B$. As such, the mirror 130$_A$ to which fiber optic cable 182$_A$ is optically coupled may be driven to an angle that reflects the optical signal 185 to the lens 184 of fiber optic cable 182$_B$.

According to an embodiment, the actuation angle is dependent on the spacing S between the lens 184 of the fiber optic cables 182 and the piezoelectrically actuated mirrors 130 and the distance D between the fiber optic cables 182 involved in the switching operation. In the illustrated embodiment, the angle of the piezoelectrically actuated mirror 130$_A$ is away from the organic substrate 105. However, it is to be appreciated that the piezoelectrically actuated mirrors 130 may also be deflected at an angle towards the organic substrate 105. As such, the piezoelectrically actuated mirrors 130 may be formed over cavities 120 formed into the organic substrate 105 in order to allow for deflection towards the organic substrate. Furthermore, while the switching illustrated in FIG. 1B is one-dimensional (i.e., all of the fiber optic cables 182 are oriented in line with each other), embodiments are not limited to such configurations. For example, the array of fiber optic cables 180 and piezoelectrically actuated mirrors 130 may be formed in two dimensions.

Figure 2:
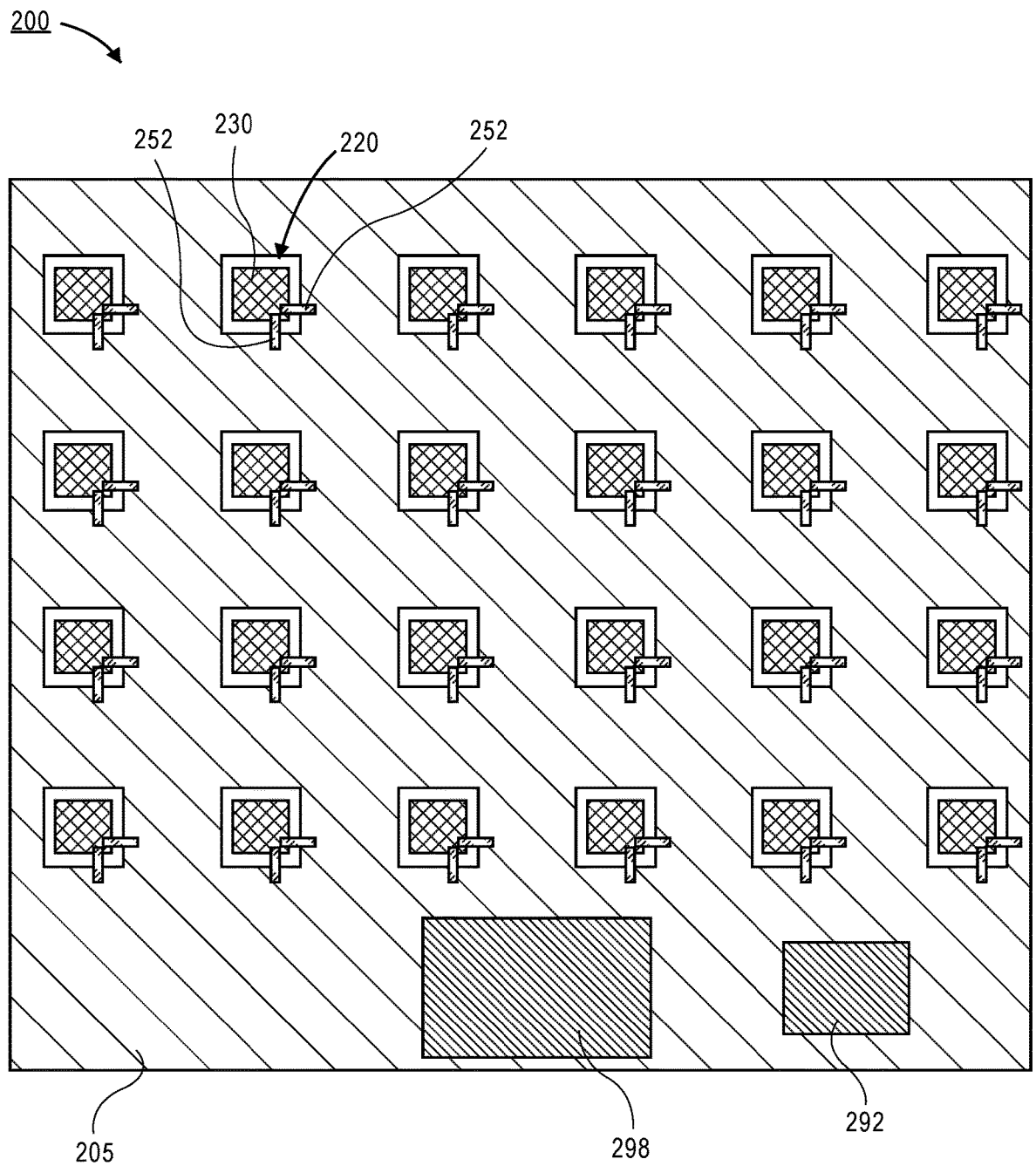
FIG. 2 is a plan view of an organic substrate that includes an array of piezoelectric mirrors for optical switching, according to an embodiment of the invention.

Referring now to FIG. 2, a plan view illustration of an array of piezoelectrically actuated mirrors 230 formed in two dimensions is shown, according to an embodiment of the invention. In FIG. 2, the optical fibers are omitted in order to not unnecessarily obscure the Figure, but it is to be appreciated that an array of optical fibers 180 may include a plurality of fiber optic cables that are each optically coupled with one of the mirrors 230 formed on the organic substrate 205. In order to allow for the mirrors 230 to be actuated in more than one direction, embodiments of the invention may include mirrors 230 that have two actuation arms 252 oriented substantially perpendicular to each other. According to an embodiment, the actuation arms 252 may be a piezoelectric stack, which will be described in greater detail below. Each of the actuation arms 252 may be electrically coupled to the routing die 298 with conductive traces (not shown) formed on or in the organic substrate 205. The ability to actuate the mirrors 230 about two axes allows for any mirror 230 to reflect an optical signal to any of the fiber optic cables in the array, regardless of the X and Y coordinates of the mirror 230 and the targeted fiber optic cable.

It is to be appreciated that the array of mirrors 230 illustrated in FIG. 2 is exemplary in nature, and is not to be a limiting example. For example, any number of rows or columns of mirrors 230 may be used. For example, thousands of mirrors 230 may be formed on an organic substrate 205. Additionally, the array of mirrors 230 is not limited to rows and columns, and can be arranged in any desired pattern. Furthermore, the depiction of the mirrors 230 as being substantially square and the actuation arms 252 being formed in the positions and shapes illustrated is exemplary as well. Additional embodiments, described in greater detail below provide a more detailed explanation of the configurations and shapes of the mirrors 230 in addition to a more detailed explanation of how the mirrors 230 are actuated.

Figure 3A:
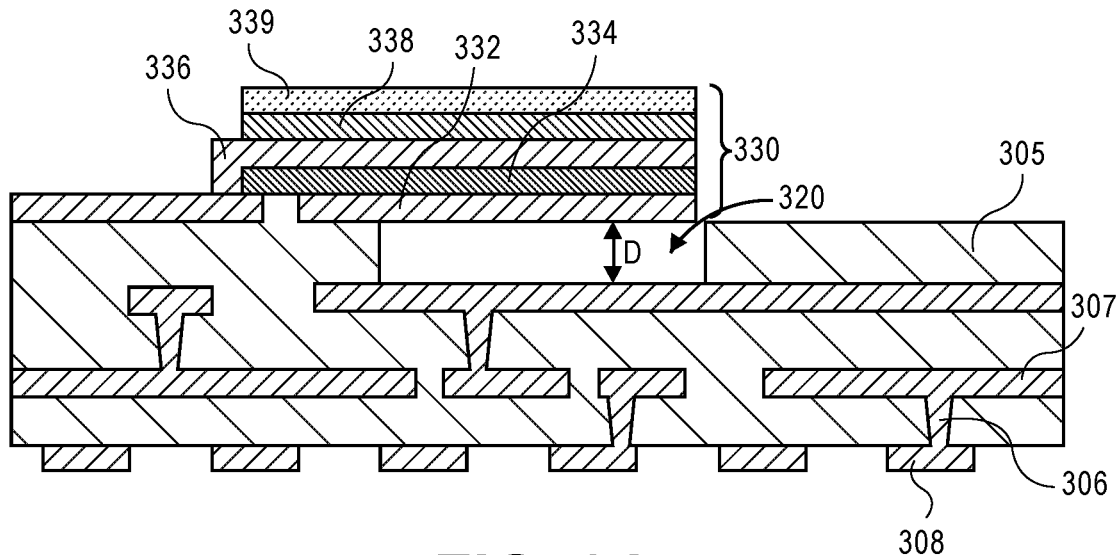
FIG. 3A is a cross-sectional illustration of a piezoelectric mirror formed on an organic substrate, according to an embodiment of the invention.

Referring now to FIG. 3A, a cross-sectional illustration of an organic substrate 305 that includes a piezoelectrically actuated mirror 330 is shown, according to an embodiment of the invention. In an embodiment, the organic substrate 305 may be any suitable organic material. By way of example, the organic substrate 305 may be a polymer material, such as, for example, polyimide, epoxy, or build-up film. The organic substrate 305 may include one or more layers (i.e., build-up layers). According to an embodiment, the microelectronic package may also include one or more conductive traces 307, vias 306, and pads 308 to provide electrical routing in the organic substrate 305. The conductive traces 307, vias 306, and pads 308 may be any suitable conductive material typically used in organic packaging applications (e.g., copper, tin, aluminum, alloys of conductive materials, and may also include multiple layers, such as seed layers, barrier layers, or the like).

According to an embodiment, the piezoelectrically actuated mirror 330 may be anchored to the organic substrate 305 and oriented so that it extends over a cavity 320 formed in the organic substrate 305. The cavity 320 may be sized so that it is larger than the mirror 330 in order to allow the mirror 330 to be displaced into the cavity 320. According to an embodiment, the depth D of the cavity 320 may be chosen to allow for the desired amount of displacement of the piezoelectrically actuated mirror 330 into the cavity 320. For example, increasing the depth D allows for greater displacement of the piezoelectrically actuated mirror 330.

According to an embodiment, the piezoelectrically actuated mirror 330 includes a high performance piezoelectric layer 334 formed between a first electrode 332 and a second electrode 336. High performance piezoelectric materials typically require a high temperature anneal (e.g., greater than 500° C.) in order to attain the proper crystal structure to provide the piezoelectric effect. As such, previous piezoelectrically actuated mirrors, such as those described above, require a substrate that is capable of withstanding high temperatures (e.g., silicon). Organic substrates, such as those described herein, typically cannot withstand temperatures above 260° C. However, embodiments of the present invention allow for a piezoelectric layer 334 to be formed at much lower temperatures. For example, instead of a high temperature anneal, embodiments include depositing the piezoelectric layer 334 in an amorphous phase and then using a pulsed laser to crystalize the piezoelectric layer 334. In an embodiment, the pulsed laser anneal may use an excimer laser with an energy between approximately 10-100 mJ/cm$^2$ and pulsewidth between approximately 10-50 nanoseconds. For example, the piezoelectric layer 334 may be deposited with a sputtering process, an ink jetting process, or the like. According to an embodiment, the piezoelectric layer may be lead zirconate titanate (PZT), potassium sodium niobate (KNN), zinc oxide (ZnO), or combinations thereof.

The first electrode 332 and the second electrode 336 may be electrically coupled to a voltage source by conductive traces 307 in the microelectronic package. For example, the voltage source may be a routing die (not shown) similar to the routing die described above. As such, a voltage applied across the first electrode 332 and the second electrode 336 may be generated. The voltage applied across the first electrode 332 and the second electrode 336 induces a strain in the piezoelectric layer 334 that causes displacement of the mirror 330. In an embodiment, the displacement of the piezoelectrically actuated mirror 330 is proportional to the voltage across the first electrode 332 and the second electrode 336, as will be described in greater detail below. In FIG. 3A, the piezoelectric layer 334 and the second electrode 336 are formed over the entire top surface of the first electrode 332, though embodiments are not limited to such configurations.

According to an embodiment, the first electrode 332 and the second electrode 336 are formed with a conductive material. In some embodiments, the first electrode 332 and the second electrode 336 may be formed with the same conductive material used to form the conductive traces 307, vias 306, and pads 308 formed in the organic substrate 305. Such an embodiment allows for the manufacturing of the microelectronic package to be simplified since additional materials are not needed, though embodiments are not limited to such configurations. For example, the electrodes 332, 336 may be different materials than the traces 306. Additional embodiments may include a first electrode 332 that is a different material than the second electrode 336. The conductive material used for the first electrode 332 and the second electrode 336 may be any conductive material (e.g., copper, aluminum, alloys, etc.).

According to an embodiment, a reflective surface 338 may be formed on the piezoelectrically actuated mirror 330. In the illustrated embodiment, the reflective surface 338 may substantially cover a top surface of the second electrode 336. As such, displacing the mirror 330 allows for the reflective surface 338 to be displaced as well. The reflective surface 338 may be sized to capture an optical signal that is emitted from a fiber optic cable. Minimizing the size of the reflective surface 338 and the piezoelectrically actuated mirror 330 may allow for more mirrors to be formed in a given area or allow for additional components to be formed on the microelectronic package 300. For example, the reflective surface 338 may have a surface area between approximately 50 μm-100 μm by 200 μm-500 μm, though reflective surfaces 338 that have smaller or larger surface areas may also be formed according to embodiments of the invention.

According to an embodiment, the reflective surface 338 may have a surface roughness that is less than approximately 300 nm. Additional embodiments may include reflective surfaces 338 that have a surface roughness that is less than approximately 100 nm. Yet another embodiment may have a surface roughness that is less than approximately 10 nm. The surface roughness may be dictated by the deposition techniques used to form the reflective surface 338. Additionally, surface treatments may be used to further reduce the surface roughness of the reflective surface 338. According to an embodiment, the reflective surface 338 may be any reflective material. For example, the reflective surface 338 may be aluminum, silver, gold, tin, alloys of reflective materials, or the like. Additional embodiments may include choosing the material or surface treatment of the reflective surface 338 to provide wavelength selective or polarizing effects. For example, gold may be used to filter out wavelengths (e.g., the wavelengths approximately 550 nm or less). According to an embodiment, a protective coating 339 may be formed over the reflective surface 338 to prevent oxidation or other damage. For example, the protective coating may be any optically clear material.

While a distinct material layer is illustrated in FIG. 3A as being the reflective surface 338, embodiments may also include using a top surface of an electrode 332, 336 as the reflective surface 338. For example, in typical microelectronic packaging operations, copper may be deposited with a surface roughness of approximately 100 nm, and the surface roughness is then increased with a surface roughening operation in order to increase the adhesion between layers. In an embodiment, the surface roughing operation may be omitted and the copper with a surface roughness of approximately 100 nm may be used as the reflective surface 338.

Figure 3B:
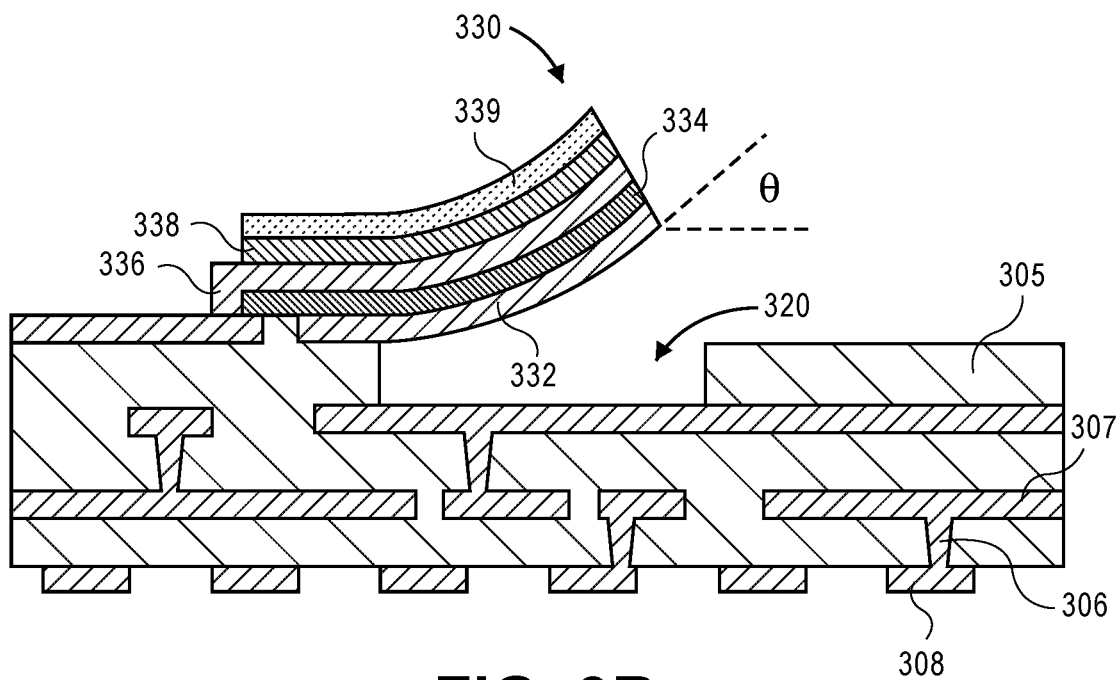
FIG. 3B is a cross-sectional illustration of the piezoelectric mirror in FIG. 3A being actuated, according to an embodiment of the invention.

Referring now to FIG. 3B, a cross-sectional illustration of an organic substrate 305 with a piezoelectrically actuated mirror 330 in an actuated state is shown, according to an embodiment of the invention. The piezoelectrically actuated mirror 330 may be displaced by applying a voltage across the first electrode 332 and the second electrode 336. The voltage produces strain in the piezoelectric layer 334 that causes the piezoelectrically actuated mirror 330 to displace towards or away from the substrate 305, depending on the bias of the voltage.

As illustrated in FIG. 3B, the piezoelectrically actuated mirror 330 is deflected away from substrate 305 at an angle θ. The deflection angle θ may be proportional to the voltage across the first electrode 332 and the second electrode 336. In an embodiment, the deflection angle θ is limited by the plastic deformation of the first and second electrodes 332, 336 (i.e., the angle θ may be up to the point where the deformation regime of the electrodes changes from elastic deformation to plastic deformation). For example, the deflection angle θ may be approximately 30° or less when copper is used for the first and second electrodes 332, 336. However, it is to be appreciated that deflection angles of approximately 10° or less may be obtained by applying voltages between approximately 10-20 volts, depending on the geometry of the piezoelectrically actuated mirror 330.

Embodiments of the invention are also not limited to digital responses (i.e., maximum deflection or no deflection). Instead, the piezoelectrically actuated mirror 330 may be deflected in an analog manner to any deflection angle less than the maximum deflection angle θ. Accordingly, embodiments of the invention may allow for incoming optical signals to be reflected to more than one location. Therefore, the piezoelectrically actuated mirror 330 may be able to be deflected to angles that allow for switching an optical signal to any input/output port in an optical routing system. In an embodiment, the displacement of the reflective surface 338 may be static (e.g., by applying a constant voltage to the piezoelectric layer 334).

Figure 4A:
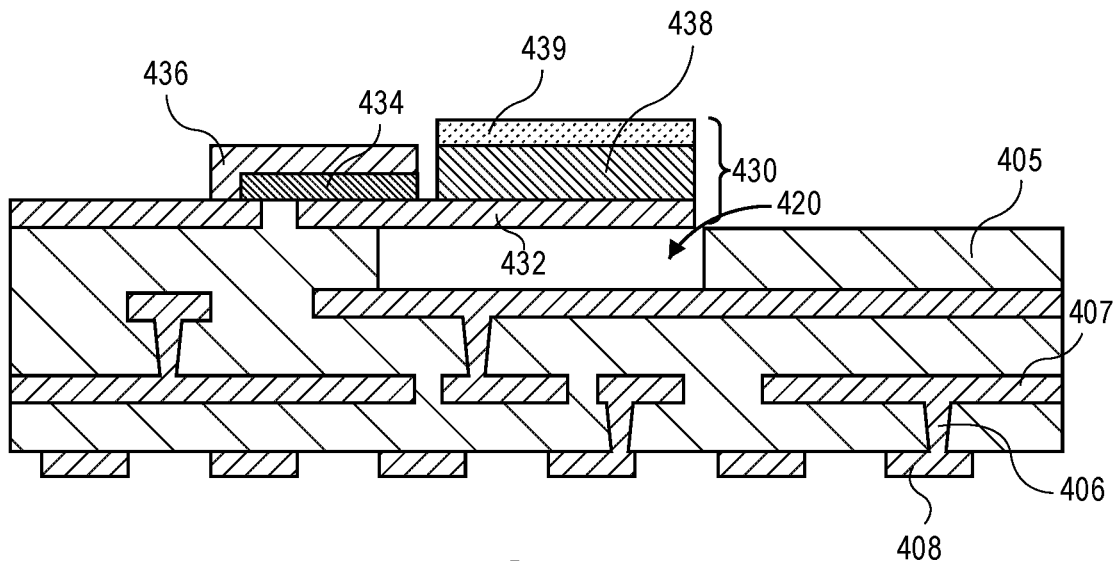
FIG. 4A is a cross-sectional illustration of a piezoelectric mirror formed on an organic substrate, according to an additional embodiment of the invention.

Referring now to FIG. 4A, a cross-sectional illustration of an organic substrate with a piezoelectrically actuated mirror 430 is shown, according to an additional embodiment of the invention. The piezoelectrically actuated mirror 430 in FIG. 4A is substantially similar to the piezoelectrically actuated mirror 330 illustrated in FIGS. 3A and 3B, with the exception that the piezoelectric layer 434 and the second electrode 436 do not extend over the entire top surface of the first electrode 432. According to an embodiment, the piezoelectric layer 434 and the second electrode 436 may still extend over at least a portion of the cavity 420. Extending the piezoelectric layer 434 over the cavity allows for the piezoelectrically actuated mirror 430 to be deflected when a voltage is applied to the first and second electrodes 432, 436, as will be described below.

In such an embodiment, the first electrode 432 may function as a pad on which the reflective surface 438 may be formed. As illustrated, the reflective surface 438 is formed over a portion of the exposed first electrode 432, though embodiments are not limited to such configurations. For example, the reflective surface 438 may be formed over substantially the entire top surface of the first electrode 432 that is not covered by the piezoelectric layer 434.

Figure 4B:
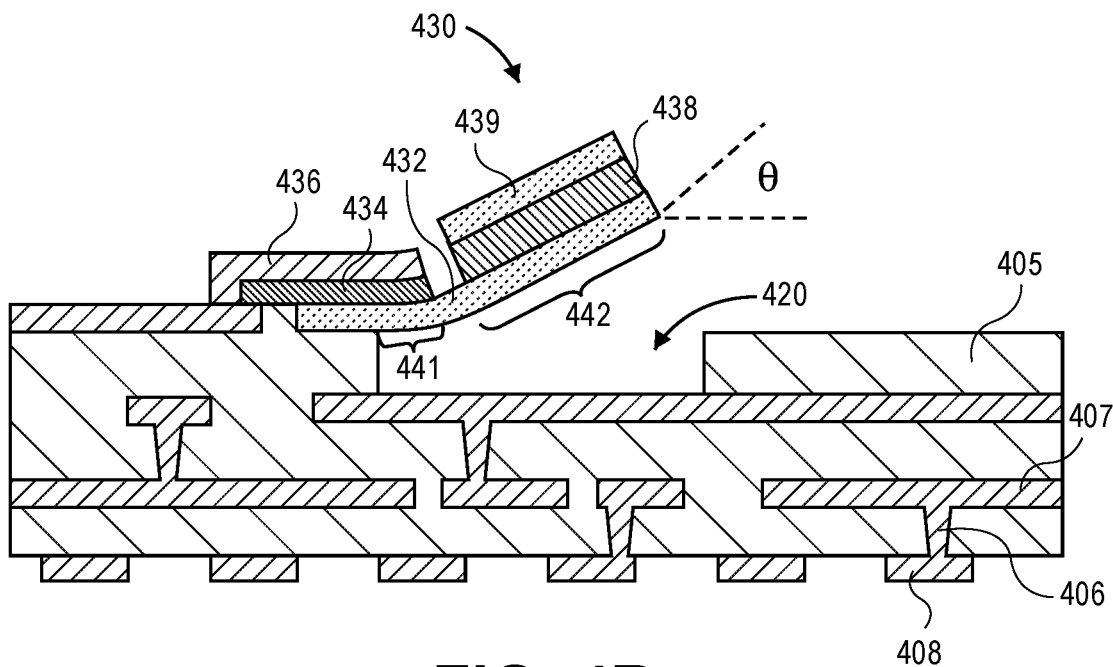
FIG. 4B is a cross-sectional illustration of the piezoelectric mirror in FIG. 4A being actuated, according to an embodiment of the invention.

Referring now to FIG. 4B, a cross-sectional illustration of an organic substrate 405 with a piezoelectrically actuated mirror 430 in an actuated state is shown, according to an embodiment of the invention. Similar to the deflection of the piezoelectrically actuated mirror 430 described above, applying a voltage across the first and second electrodes 432, 436 produces a strain in the piezoelectric layer 434 that causes the piezoelectrically actuated mirror 430 to deflect away from or towards the organic substrate 405. An advantage to not extending the piezoelectric layer 434 entirely across the top surface of the first electrode 432 is that the deflection becomes more linear. As illustrated, the piezoelectrically actuated mirror 430 includes a non-linear (e.g., curved) portion 441 where the piezoelectric layer 434 is formed and a linear portion 442 where there is no piezoelectric layer 434. Accordingly, the reflective surface 438 may be formed on a surface that does not curve when the actuator deflects.

According to an additional embodiment of the invention, the mirror formed on the actuator may also be a discrete component that is bonded to the actuator instead of being deposited onto the actuator. In one embodiment, the reflective surface may be a die that is mounted to the piezoelectrically actuated mirror with a bonding layer. For example, the bonding layer may be an epoxy, a solder, or the like. Forming the reflective surface as a discrete die may allow for a plurality of reflective surfaces to be fabricated on a substrate other than the organic substrate 305, and then the die may be mounted to a piezoelectrically actuated mirror with a pick and place tool, or any other mounting technique. Forming the reflective surface as a discrete component may also allow for more complex mirrors to be used without significantly decreasing the throughput. In addition to using a die for the reflective surface, embodiments may also include a reflective surface that is a thin sheet of reflective material (e.g., aluminum, silver, gold, tin, alloys of reflective materials, etc.).

Referring now to FIGS. 5A-5E, a series of plan view illustrations of piezoelectrically actuated mirrors 530 are shown, according to various embodiments of the invention. In order to not unnecessarily obscure the Figures, the reflective surface is omitted. However, it is to be appreciated that the reflective surface may be mounted or formed on the piezoelectrically actuated mirrors 530 similar to the devices described above. Additionally, conductive features (e.g., vias, traces, etc.) that may be formed in the organic substrate have been omitted. However, it is to be appreciated that the electrodes of the actuator may be electrically coupled to a voltage source by one or more traces and/or vias.

Figure 5A:
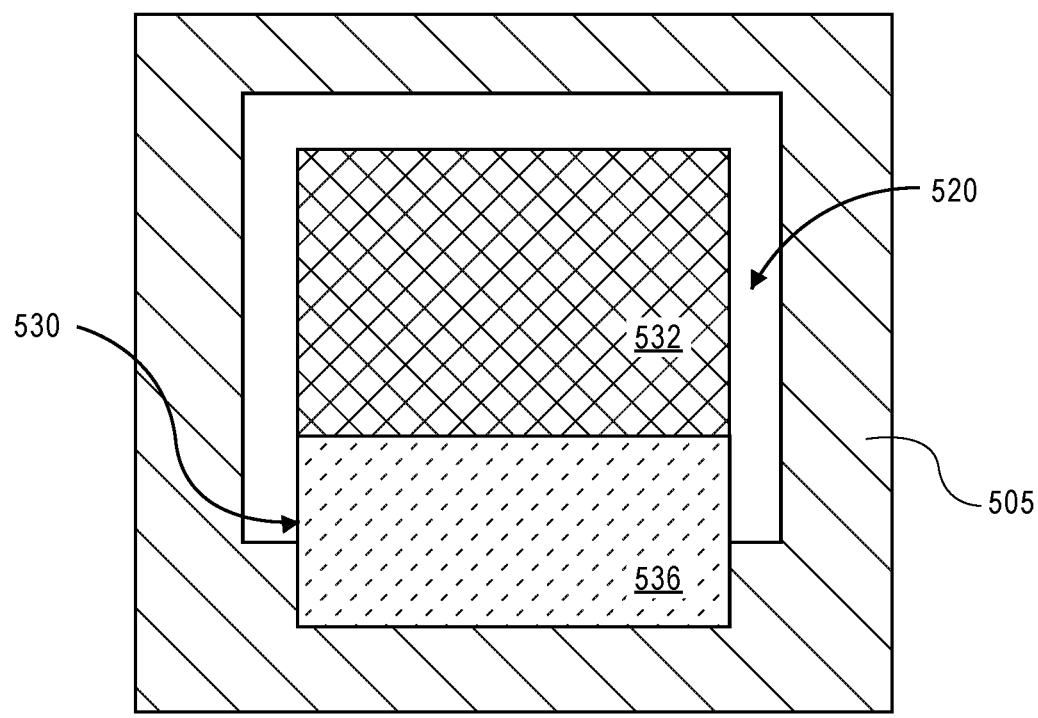
FIG. 5A is a plan view of a piezoelectrically actuated mirror that extends over a cavity and is anchored to an organic substrate along one edge of the cavity, according to an embodiment of the invention.

Referring now to FIG. 5A, the second electrode 536 extends out from the organic substrate 505 over the cavity 520. According to an embodiment, the width of the first and second electrodes 532, 536 may be substantially equal to each other. As such, the second electrode 536 and the piezoelectric layer (not visible in FIG. 5A) extend substantially along an entire edge of the first electrode 532. Accordingly, the piezoelectrically actuated mirror 532 forms a cantilever beam that can be deflected into the cavity 520 or away from the organic substrate 505. Such an embodiment may allow for deflection about a single axis and, therefore, may be suitable for use in one-dimensional switching applications.

Figure 5B:
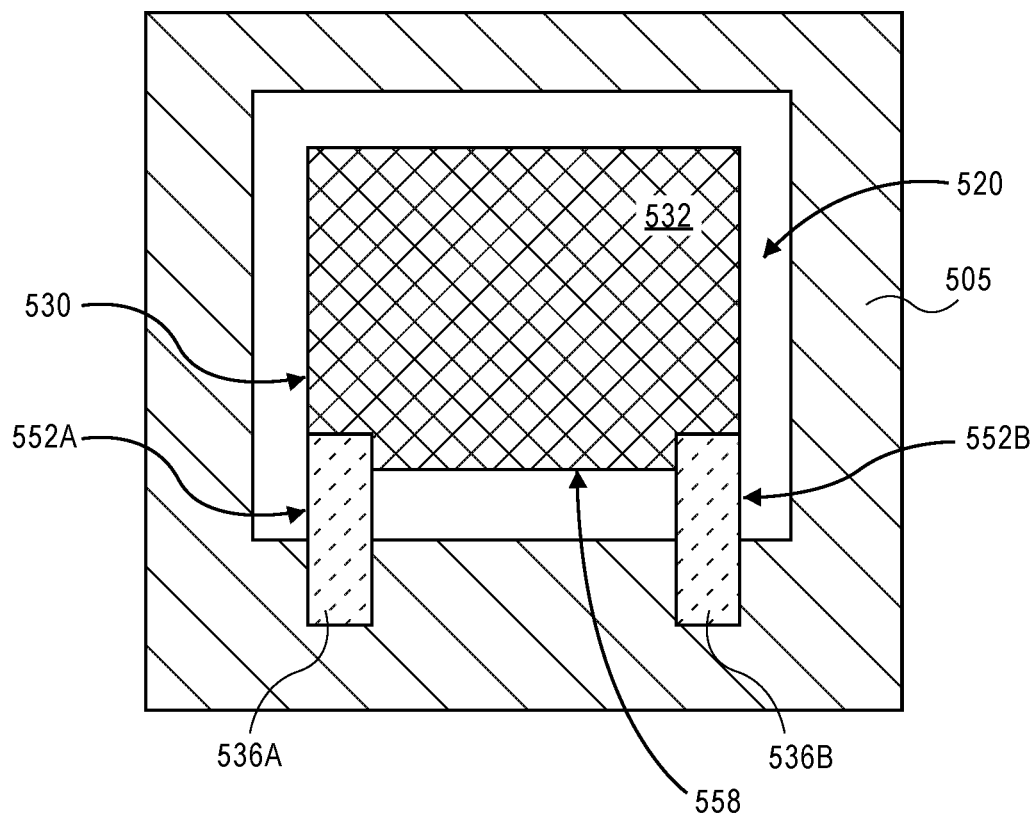
FIG. 5B is a plan view of a piezoelectrically actuated mirror that includes two actuation arms anchored to an organic substrate, according to an embodiment of the invention.

Referring now to FIG. 5B, a plan view illustration of a piezoelectrically actuated mirror 530 that is anchored to the organic substrate 505 with two actuation arms 552 is shown, according to an embodiment of the invention. As illustrated in FIG. 5B, actuation arms 552A and 552B are formed on opposite ends of an edge 558 of the first electrode 532. In an embodiment, the actuation arms 552 may be beams that extend out from the organic substrate 505 over the cavity 520. Each actuation arm 552 may include a stack that includes a portion of the piezoelectric layer (not visible in FIG. 5B) formed between a portion of the first electrode 532 and a portion of the second electrode 536. It is to be appreciated that a portion of the first electrode 532 also attaches to the organic substrate 505. Accordingly, the first electrode 532 may be a single continuous layer that has beam like portions that extend out from the organic substrate 505 and attach to a pad portion on which the reflective layer (not shown) may be placed or formed. In contrast, the second electrode 536 may be a discontinuous layer. For example, the first actuation arm 552A may include a first portion of the second electrode 536A and the second actuation arm 552 may include a second portion of the second electrode 536B. In an embodiment, the first portion 536A may be electrically isolated from the second portion 536B in order to allow for each actuation arm 552 to be controlled independently. Alternative embodiments may have the first portion 536A and the second portion 536B electrically coupled to each other and held at the same voltage.

Figure 5C:
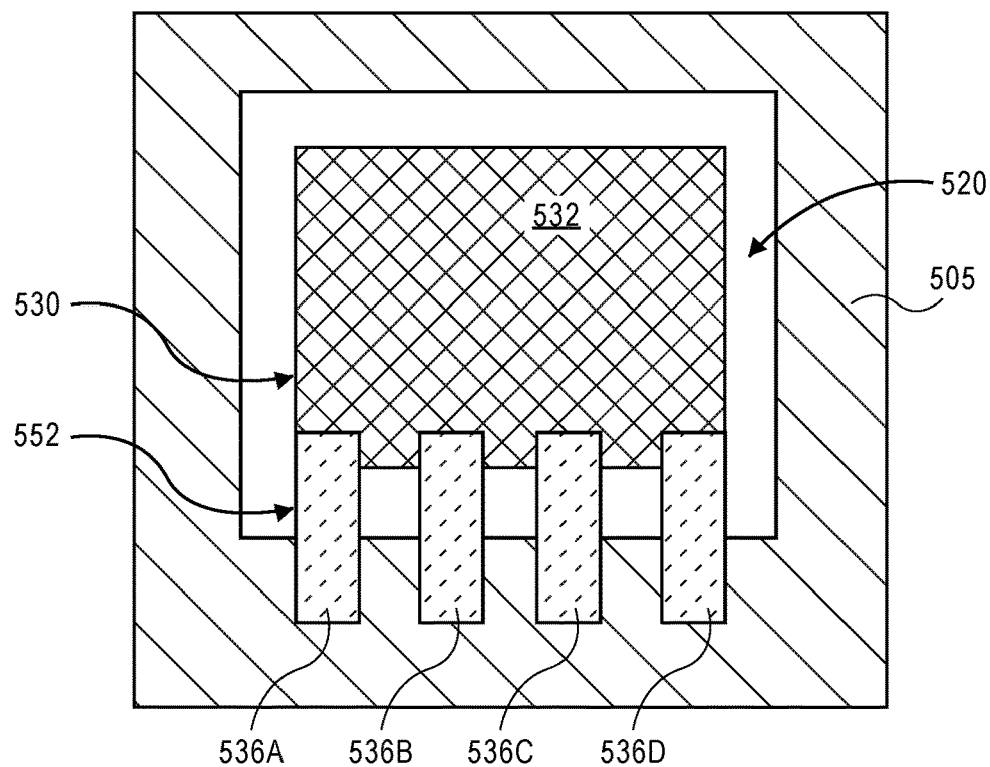
FIG. 5C is a plan view of a piezoelectrically actuated mirror that includes a plurality of actuation arms anchored to an organic substrate, according to an embodiment of the invention.

Referring now to FIG. 5C, a plan view illustration is shown that more clearly illustrates how a piezoelectrically actuated mirror 530 is anchored to the organic substrate 505 with a plurality of actuation arms 552, according to an embodiment of the invention. The piezoelectrically actuated mirror 530 is substantially similar to the piezoelectrically actuated mirror 530 described above in FIG. 5B, with the exception that more than two actuation arms 552 are included. Similar to above, each portion of the second electrode 536A-536D may be electrically isolated and allow for independent control of each actuation arm 552 or they may be electrically coupled and actuated in unison.

In the piezoelectrically actuated mirrors illustrated in FIGS. 5A-5C, the second electrode 536 and the piezoelectric layer (not visible) do not extend completely across the top surface of the first electrode 532. However, embodiments are not limited to such configurations. For example, the second electrode 536 and the piezoelectric layer may extend completely over a top surface of the first electrode 532, similar to the cross-sectional illustrations shown in FIGS. 3A and 3B. The increased length of the piezoelectric layer and the second electrode 536 may allow for a greater deflection angle to be obtained with the same voltages, compared to the embodiments where the piezoelectric layer and the second electrode do not extend across the entire length of the first electrode.

Figure 5D:
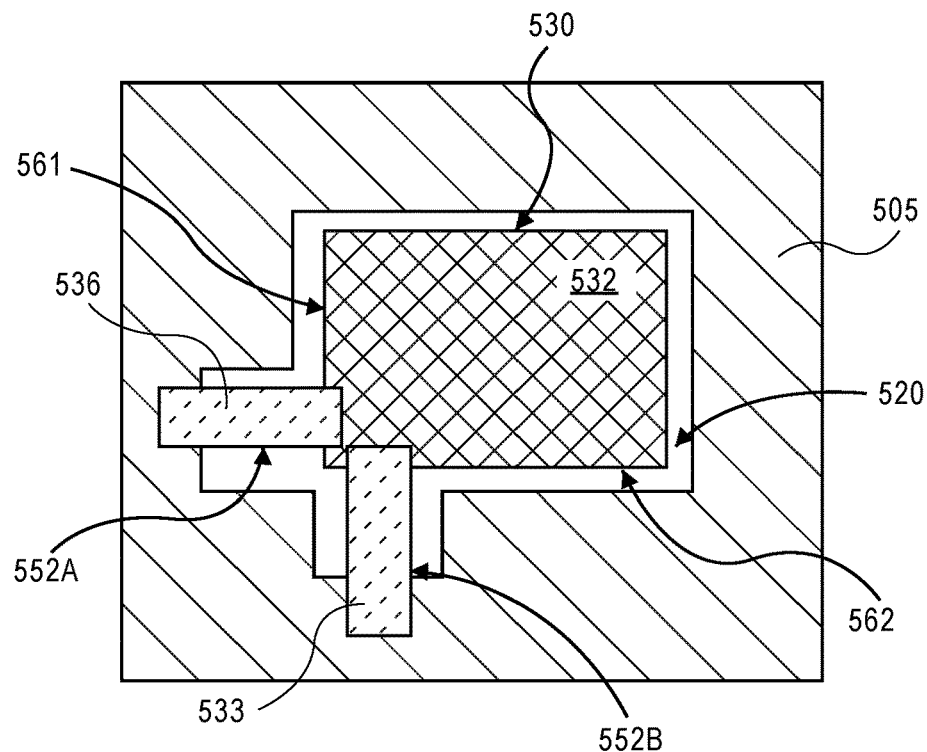
FIG. 5D is a plan view of a piezoelectrically actuated mirror with two actuation arms that are formed on different edges of the actuated structure, according to an embodiment of the invention.

According to an additional embodiment of the invention, the piezoelectrically actuated mirrors may be deflected in more than one direction to enable two-dimensional switching. One example of such an embodiment is illustrated in FIG. 5D. As illustrated, a piezoelectrically actuated mirror 530 may have a first actuation arm 552A formed along a first edge 561 of the first electrode 532 and a second actuation arm 552B formed along a second edge 562 of the first electrode 532. According to an embodiment, the first actuation arm 552A may include a second electrode 536 that is formed over a piezoelectric layer (not visible in FIG. 5D) and the second actuation arm 552B may include a third electrode 533 that is also formed over a piezoelectric layer (not visible in FIG. 5D). According to an embodiment, the second electrode 536 and the third electrode 533 may be electrically isolated from each other and able to operate independently from each other. Accordingly, the piezoelectrically actuated mirror 530 may be deflected about an axis substantially parallel to the first edge 561 by the first actuation arm 552A and about an axis substantially parallel to the second edge 562 by the second actuation arm 552B.

Figure 5E:
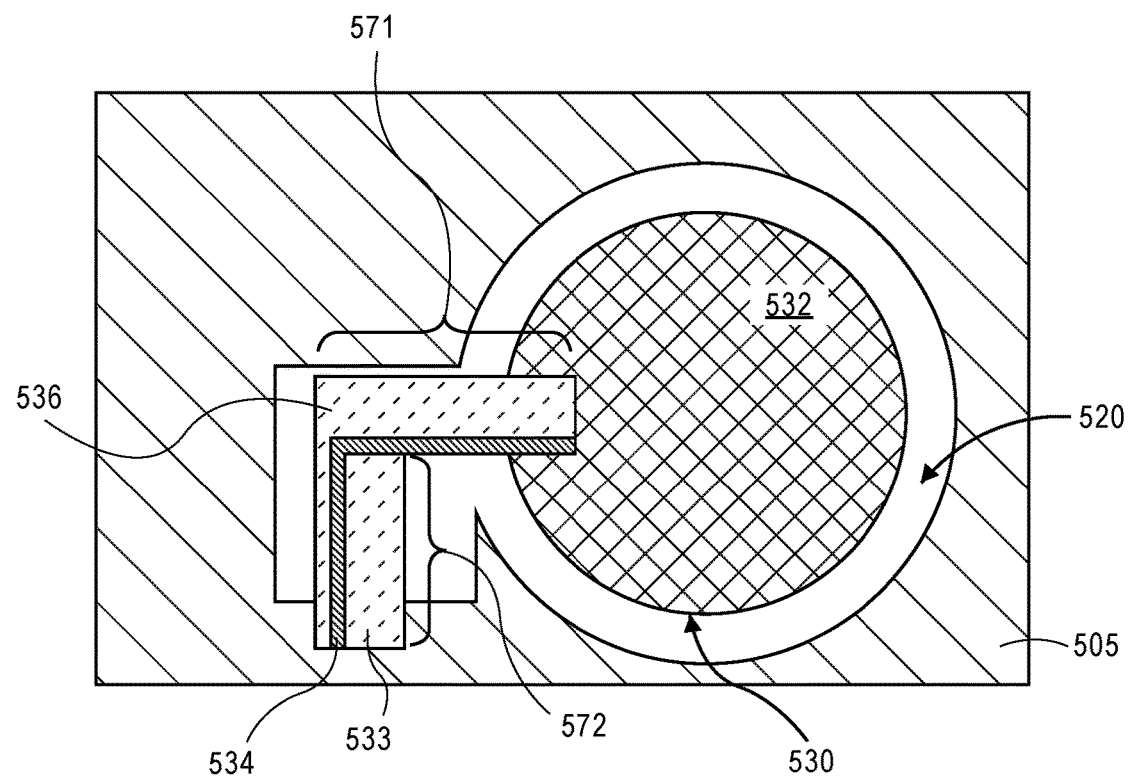
FIG. 5E is a plan view of a piezoelectrically actuated mirror that includes a single actuation arm that allows for deflection in multiple directions, according to an embodiment of the invention.

Referring now to FIG. 5E, a plan view illustration of a microelectronic package 500 with an actuator 530 that may be deflected in more than one direction is shown according to an additional embodiment of the invention. Instead of requiring two actuation arms that are attached to different edges of the first electrode 532, embodiments of the invention may include an actuation arm that has a first length 571 and a second length 572. According to an embodiment, the second length 572 may be substantially orthogonal to the first length 571. In order to isolate actuation to the different lengths of the actuation arm, a second electrode 536 may be formed primarily along the first length 571, and a third electrode 533 may be formed along the second length 572. As shown in FIG. 5E, the spacing between the second electrode 536 and the third electrode 533 exposes a portion of the piezoelectric layer 534 that is formed below both the second and the third electrodes 536, 533.

In some embodiments, the second electrode 536 may also extend along the second length 572 in order to be electrically coupled to a contact on the organic substrate 505. However, it is to be appreciated that the surface area of the third electrode 533 over the piezoelectric layer 534 in the second length 572 is greater than the surface area of the second electrode 536. As such, the actuation provided by the second length is primarily controlled by applying a voltage across the third electrode 533 and the first electrode 532, and the actuation provided by the first length 571 is primarily controlled by applying a voltage across the second electrode 536 and the first electrode 532.

While the embodiments described in the previous Figures have included actuators with substantially rectangular shaped pads for supporting the reflective surface, it is to be appreciated that embodiments are not limited to such configurations. For example, 5E illustrates a piezoelectrically actuated mirror 530 that has a substantially circular pad for supporting a reflective surface. The use of a circular shaped pad may allow for the elimination of corner reflection effects that may be experienced when rectangular shaped pads are used. Additionally, it is to be appreciated that embodiments of the invention may also include an actuator with a piezoelectric layer and a second electrode that cover the entire top surface of the first electrode, and which are substantially circular as well. Furthermore, embodiments may include a substantially circular shaped pad in combination with any of the actuation arm configurations described herein (e.g., single arm, multi-arm, multi-arm with multiple axis deflection, single-arm with multiple axis deflection, etc.)

Figure 6A:
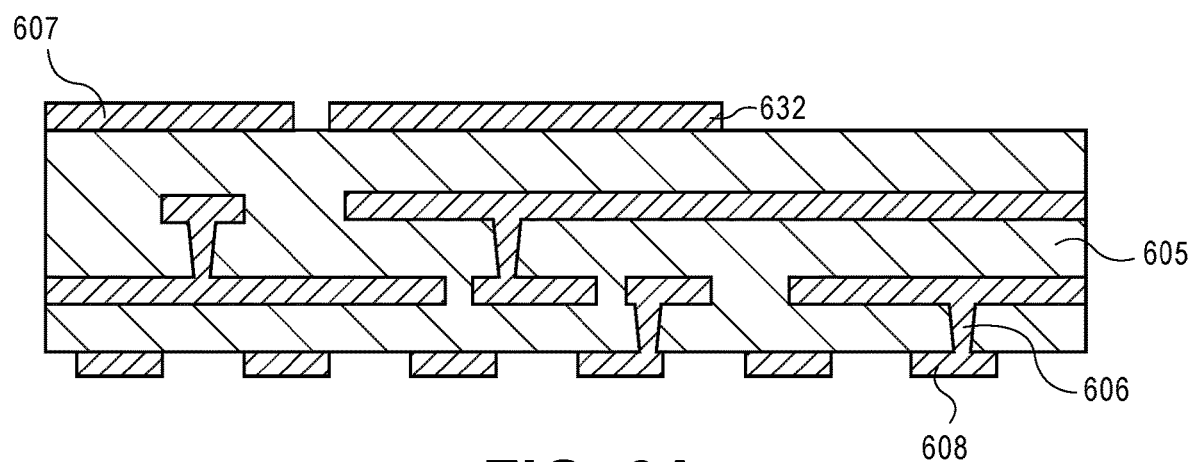
FIG. 6A is a cross-sectional illustration of an organic substrate after the first electrode has been formed, according to an embodiment of the invention.

Referring now to FIGS. 6A-6E, a process flow for forming an actuator in an organic substrate is shown according to an embodiment of the invention. Referring now to FIG. 6A, the first electrode 632 is formed over a top surface of an organic substrate 605. According to an embodiment, the first electrode 1332 may be formed with manufacturing processes known in the semiconductor and substrate manufacturing industries, such as semi-additive processing, subtractive processing, or the like.

Figure 6B:
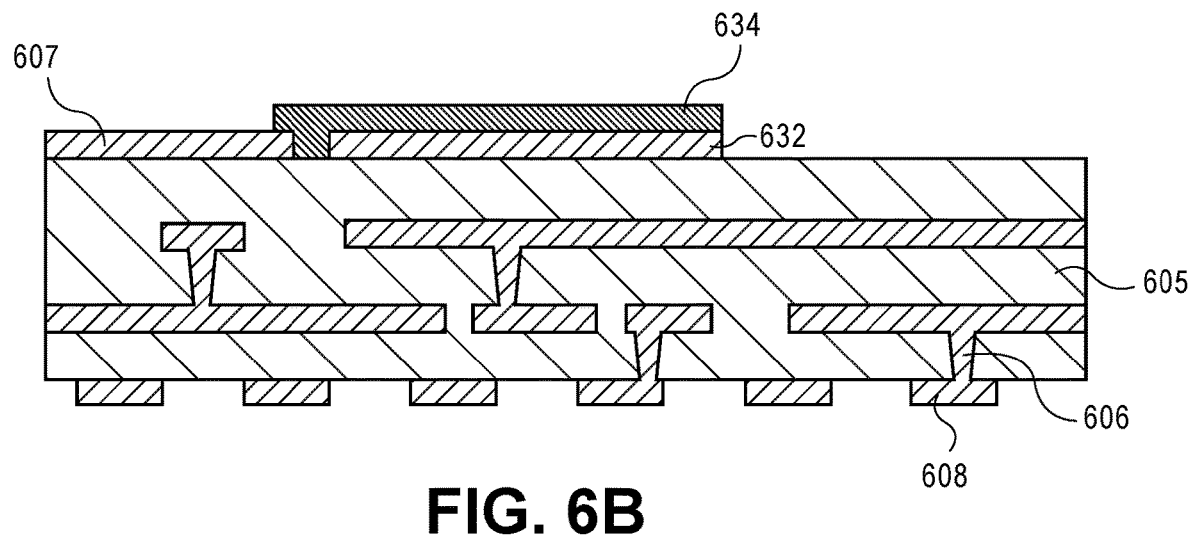
FIG. 6B is a cross-sectional illustration of the organic substrate after the piezoelectric layer has been formed, according to an embodiment of the invention.

Referring now to FIG. 6B, a piezoelectric material may be formed over the first electrode 632 to form a piezoelectric layer 634. According to an embodiment, the piezoelectric layer may be deposited in an amorphous phase. In order to increase the piezoelectric properties of the piezoelectric layer 634, the amorphous layer may be crystallized with a laser annealing process. For example, the piezoelectric layer 634 may be deposited with a sputtering process, an ink jetting process, or the like. According to an embodiment, the piezoelectric layer 634 may be PZT, KNN, ZnO, or combinations thereof. In an embodiment, the laser annealing process may be a pulsed laser anneal and implemented so that the temperature of the organic substrate 605 does not exceed approximately 260° C. In an embodiment, the pulsed laser anneal may use an excimer laser with an energy between approximately 10-100 mJ/cm$^2$ and pulsewidth between approximately 10-50 nanoseconds.

Figure 6C:
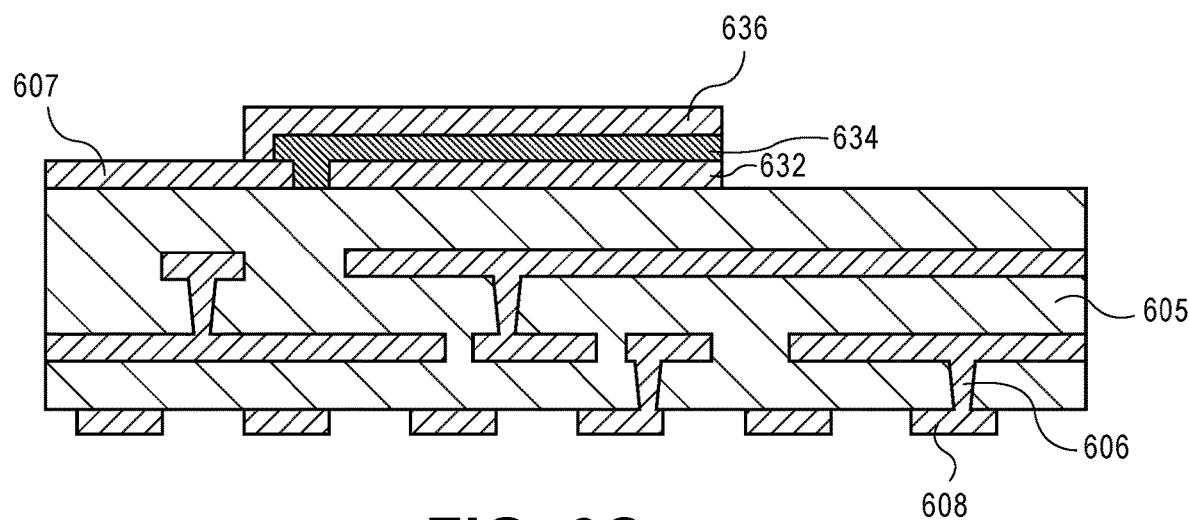
FIG. 6C is a cross-sectional illustration of the organic substrate after the second electrode has been formed, according to an embodiment of the invention.

Referring now to FIG. 6C, a second electrode 636 may be formed over the piezoelectric layer 634. According to an embodiment, the second electrode 636 may be formed with damascene processes. As illustrated, the second electrode 636 may be electrically coupled to a conductive trace 607 on the organic substrate 605 that is electrically isolated from the first electrode 632. Accordingly, a voltage may be applied across the first electrode 632 and the second electrode 636. Furthermore, it is to be appreciated that additional electrodes may be formed over the piezoelectric layer 634 in order to provide additional actuation arms that allow for deflection of the actuator about more than one axis.

Figure 6D:
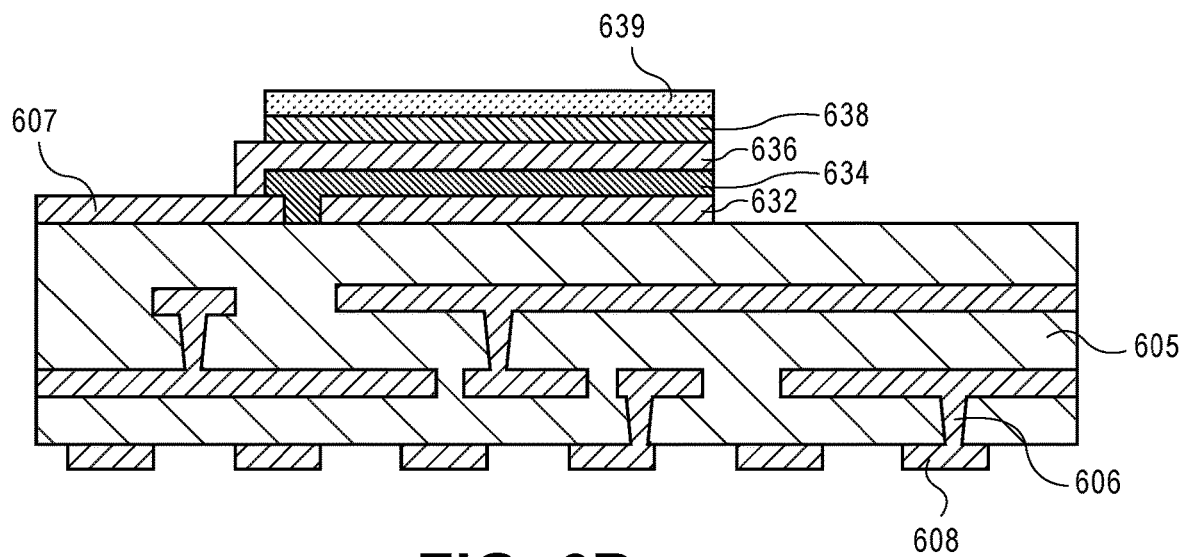
FIG. 6D is a cross-sectional illustration of the organic substrate after the reflective surface has been formed, according to an embodiment of the invention.

Referring now to FIG. 6D, a reflective surface 638 may be formed over the second electrode 636. According to an embodiment, the reflective surface 638 may be formed by depositing and patterning a layer of reflective material (e.g., silver, aluminum, tin, gold, etc.). For example, the deposition process may be a sputtering, evaporation, or other suitable deposition process that is compatible with organic substrates. In some embodiments a protective coating 639 may also be deposited over the reflective surface 638 in order to prevent oxidation or other damage.

Figure 6E:
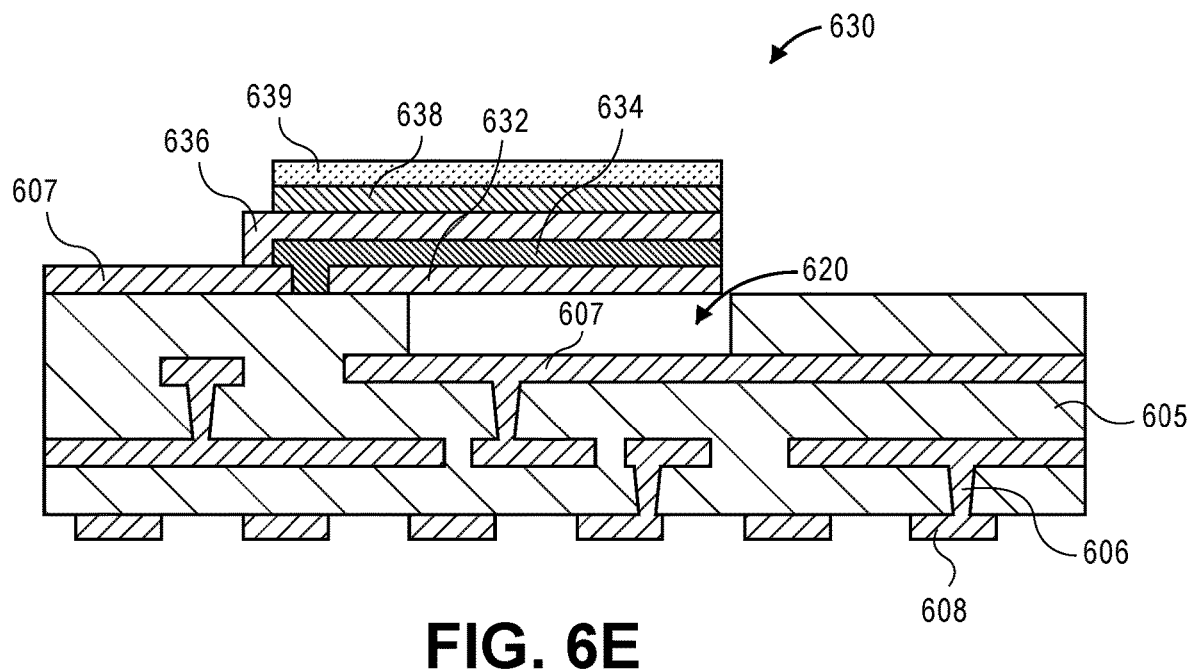
FIG. 6E is a cross-sectional illustration of the organic substrate after a cavity is formed in the organic substrate below the piezoelectrically actuated mirror, according to an embodiment of the invention.

Referring now to FIG. 6E, the piezoelectrically actuated mirror 630 is released from the organic substrate 605 in order to allow for actuation. The piezoelectrically actuated mirror 630 may be released by forming a cavity 620 below a portion of the first electrode 632. For example, the cavity may be formed with a photolithographic and etching process that selectively removes the organic substrate 605. For example, the etching process may be a reactive ion etching process, or any other anisotropic etching process. In embodiments where the pad region is too large to allow for adequate removal of the organic substrate 605 below the pad, one or more holes may be formed through the piezoelectrically actuated mirror 630 to allow for the plasma of the etching process to pass through the piezoelectrically actuated mirror 630 and remove the organic substrate 605 below. As illustrated, embodiments may use a trace 607 as an etchstop layer to provide the desired depth of the cavity.

While the process for forming the actuator in FIGS. 6A-6E illustrate a piezoelectrically actuated mirror similar to the one described above with respect to FIG. 1A, it is to be appreciated that substantially similar operations may be used to form any of the piezoelectrically actuated mirrors described herein. For example, the formation of the piezoelectric layer 634 and the second electrode 636 may be modified such that a portion of the first electrode 632 remains exposed and the reflective surface 638 is formed over the first electrode 632, similar to the piezoelectrically actuated mirror described with respect to FIG. 4A. Additional embodiments may include forming the mirror with a discrete die that is mounted to the piezoelectrically actuated mirror 630 instead of being deposited on an electrode. Additionally, it is to be appreciated that one or more actuation arms may be defined with the patterning and deposition processes as well.

Figure 7:
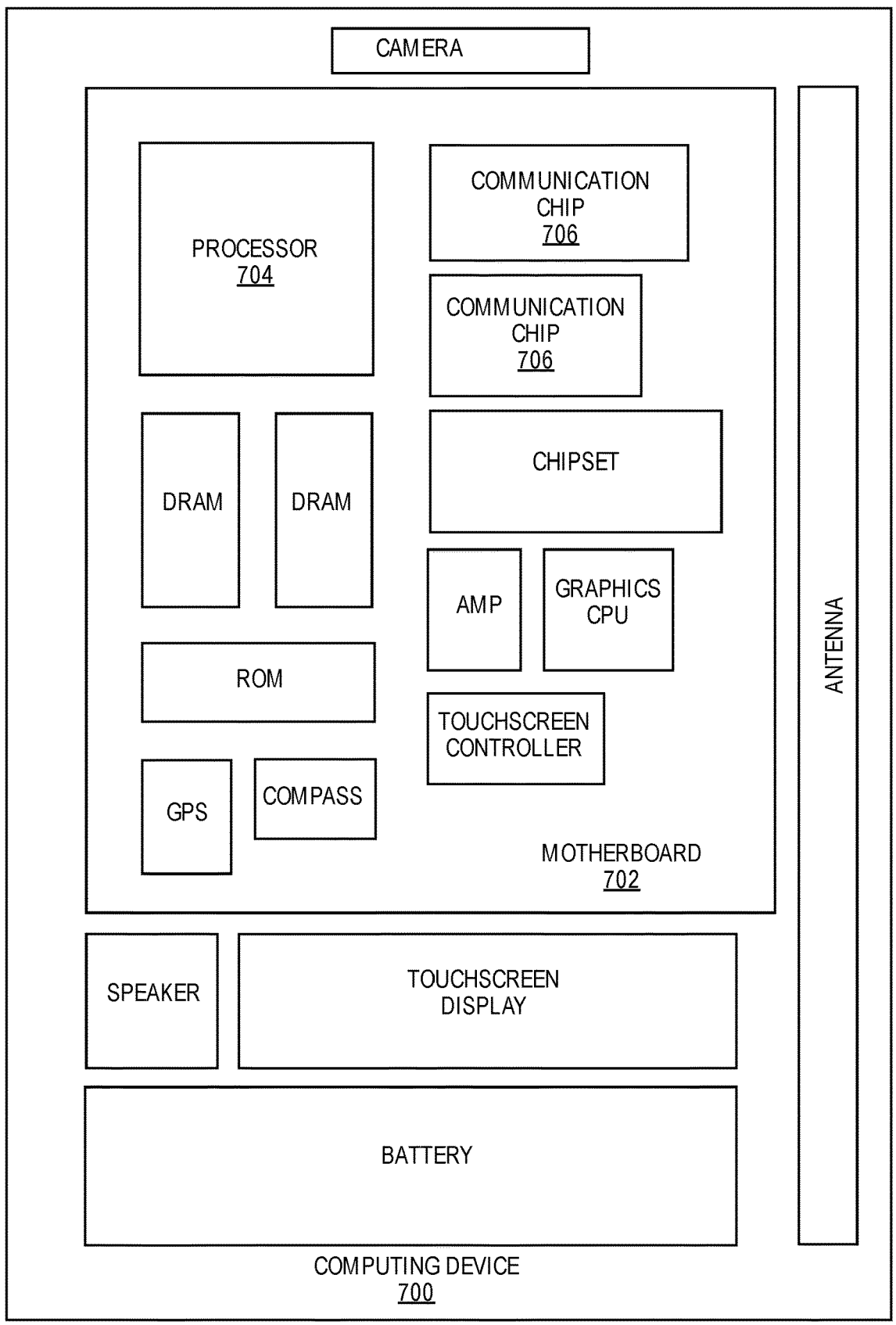
FIG. 7 is a schematic of a computing device built in accordance with an embodiment of the invention.

FIG. 7 illustrates a computing device 700 in accordance with one implementation of the invention. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. In some implementations of the invention, the integrated circuit die of the processor may be packaged on an organic substrate and provide routing signals for actuating one or more piezoelectrically actuated mirrors, in accordance with implementations of the invention. The term "processor" may refer to any device or portion of a device that processes electronic data from registers and/or memory to transform that electronic data into other electronic data that may be stored in registers and/or memory.

The communication chip 706 also includes an integrated circuit die packaged within the communication chip 706. In accordance with another implementation of the invention, the integrated circuit die of the communication chip may be packaged on an organic substrate that includes one or more piezoelectrically actuated mirrors, in accordance with implementations of the invention.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Embodiments of the invention include an optical routing device, comprising: an organic substrate; an array of cavities formed into the organic substrate; and an array of piezoelectrically actuated mirrors anchored to the organic substrate, wherein each of the piezoelectrically actuated mirrors extends over a cavity, and wherein each of the piezoelectrically actuated mirrors comprises: a first electrode; a piezoelectric layer formed on the first electrode; a second electrode formed on the piezoelectric layer; and a reflective surface formed on a top surface of the piezoelectrically actuated mirror.

Additional embodiments of the invention include an optical routing device, further comprising: a routing die mounted on the organic substrate, wherein the routing die is electrically coupled to each of the piezoelectrically actuated mirrors and is configured to generated a voltage across the first and second electrodes of each piezoelectrically actuated mirror.

Additional embodiments of the invention include an optical routing device, further comprising: a photodetector electrically coupled to the routing die, wherein the photodetector converts an optical signal into an electrical signal.

Additional embodiments of the invention include an optical routing device, further comprising: an array of fiber optic cables, wherein each of the fiber cables is optically coupled with one of the piezoelectrically actuated mirrors.

Additional embodiments of the invention include an optical routing device, wherein each of the fiber cables includes an optical splitter that is optically coupled with the photodetector.

Additional embodiments of the invention include an optical routing device, wherein each of the fiber optic cables includes an optical delay.

Additional embodiments of the invention include an optical routing device, wherein the array of piezoelectrically actuated mirrors is a two dimensional array.

Additional embodiments of the invention include an optical routing device, wherein the reflective surface is formed on the second electrode.

Additional embodiments of the invention include an optical routing device, wherein each of the piezoelectrically actuated mirrors include one or more actuation arms, and wherein each of the piezoelectrically actuated mirrors is anchored to the organic substrate by the one or more actuation arms.

Additional embodiments of the invention include an optical routing device, wherein the piezoelectric layer and the second electrode do not extend past the actuation arms.

Additional embodiments of the invention include an optical routing device, wherein the reflective surface is formed on the first electrode.

Additional embodiments of the invention include an optical routing device, wherein a first actuation arm of each piezoelectrically actuated mirror deflects the piezoelectrically actuated mirror about a first axis and a second actuation arm of each piezoelectrically actuated mirror deflects the piezoelectrically actuated mirror about a second axis.

Additional embodiments of the invention include an optical routing device, wherein a first actuation arm of each piezoelectrically actuated mirror has a first length for deflecting the piezoelectrically actuated mirror about a first axis and a second length oriented substantially perpendicular to the first length for deflecting the piezoelectrically actuated mirror about a second axis.

Additional embodiments of the invention include an optical routing device, wherein the first and second electrodes are formed along the first and second length of the first actuation arm, a third electrode is formed on the second length of the first actuation arm, and wherein a surface area of the third electrode over the second length is greater than a surface area of the second electrode over the second length.

Embodiments of the invention include a method of forming an optical routing device with an organic substrate, comprising: forming a plurality of first electrodes over the organic substrate; depositing a piezoelectric layer over the first electrodes, wherein the piezoelectric layer is an amorphous layer; crystallizing the piezoelectric layer with a pulsed laser anneal, wherein a temperature of the organic substrate does not exceed 260° C.; forming a plurality of second electrodes over a top surface of the piezoelectric layer; forming a plurality of reflective surfaces above a pad portion of the first electrodes; forming a plurality of cavities below a portion of the first electrodes; mounting a routing die onto the organic substrate, wherein the routing die is electrically coupled to each of the first and second electrodes of each; and mounting a photodetector to the organic substrate, wherein the photodetector is electrically coupled to the routing die.

Additional embodiments of the invention include a method of forming an optical routing device with an organic substrate, wherein the piezoelectric layer is deposited with a sputtering or ink-jetting process.

Additional embodiments of the invention include a method of forming an optical routing device with an organic substrate, wherein the cavity is formed with a reactive ion etching process, and wherein an etchstop layer is formed in the organic substrate below the first electrode.

Additional embodiments of the invention include a method of forming an optical routing device with an organic substrate, wherein the piezoelectric layer and the second electrode do not completely cover a top surface of the first electrode.

Additional embodiments of the invention include a method of forming an optical routing device with an organic substrate, wherein the mirror is formed on the first electrode.

Additional embodiments of the invention include a method of forming an optical routing device with an organic substrate, wherein the mirror is a die that is mounted to the first electrode with a bonding layer.

Embodiments of the invention include an optical routing device, comprising: an organic substrate; an array of cavities formed into the organic substrate; an array of piezoelectrically actuated mirrors anchored to the organic substrate, wherein each of the piezoelectrically actuated mirrors extends over a cavity; a routing die mounted on the organic substrate, wherein the routing die is electrically coupled to each of the piezoelectrically actuated mirrors and is configured to generated a voltage across a first and a second electrode of each piezoelectrically actuated mirror; a photodetector electrically coupled to the routing die, wherein the photodetector converts an optical signal into an electrical signal; and an array of fiber optic cables, wherein each of the fiber cables is optically coupled with one of the piezoelectrically actuated mirrors, and wherein each fiber optic cable includes an optical splitter that is optically coupled with the photodetector.

Additional embodiments of the invention include an optical routing device, wherein the array of piezoelectrically actuated mirrors is a two dimensional array.

Additional embodiments of the invention include an optical routing device, wherein each of the piezoelectrically actuated mirrors comprises: a first electrode; a piezoelectric layer formed on the first electrode; a second electrode formed on the piezoelectric layer; and a reflective surface formed on a top surface of the piezoelectrically actuated mirror.

Additional embodiments of the invention include an optical routing device, wherein each of the piezoelectrically actuated mirrors include one or more actuation arms, and wherein each of the piezoelectrically actuated mirrors is anchored to the organic substrate by the one or more actuation arms.

Additional embodiments of the invention include an optical routing device, wherein a first actuation arm of each piezoelectrically actuated mirror deflects the piezoelectrically actuated mirror about a first axis and a second actuation arm of each piezoelectrically actuated mirror deflects the piezoelectrically actuated mirror about a second axis.

What is claimed is:
1. An optical routing device, comprising:
   an organic substrate;
   an array of cavities formed into the organic substrate, wherein a bottom surface of each cavity comprises a conductive layer; and
   an array of piezoelectrically actuated mirrors anchored to the organic substrate, wherein each of the piezoelectrically actuated mirrors extends over a cavity, and wherein each of the piezoelectrically actuated mirrors comprises:
      a first electrode;
      a piezoelectric layer formed on the first electrode;

a second electrode formed on the piezoelectric layer; and a reflective surface formed on a top surface of the piezoelectrically actuated mirror.

2. The optical routing device of claim 1, further comprising:

a routing die mounted on the organic substrate, wherein the routing die is electrically coupled to each of the piezoelectrically actuated mirrors and is configured to generated a voltage across the first and second electrodes of each piezoelectrically actuated mirror.

3. The optical routing device of claim 2, further comprising:

a photodetector electrically coupled to the routing die, wherein the photodetector converts an optical signal into an electrical signal.

4. The optical routing device of claim 3, further comprising:

an array of fiber optic cables, wherein each of the fiber cables is optically coupled with one of the piezoelectrically actuated mirrors.

5. The optical routing device of claim 4, wherein each of the fiber cables includes an optical splitter that is optically coupled with the photodetector.

6. The optical routing device of claim 4, wherein each of the fiber optic cables includes an optical delay.

7. The optical routing device of claim 1, wherein the array of piezoelectrically actuated mirrors is a two dimensional array.

8. The optical routing device of claim 1, wherein the reflective surface is formed on the second electrode.

9. The optical routing device of claim 1, wherein each of the piezoelectrically actuated mirrors include one or more actuation arms, and wherein each of the piezoelectrically actuated mirrors is anchored to the organic substrate by the one or more actuation arms.

10. The optical routing device of claim 9, wherein the piezoelectric layer and the second electrode do not extend past the actuation arms.

11. The optical routing device of claim 10, wherein the reflective surface is formed on the first electrode.

12. The optical routing device of claim 9, wherein a first actuation arm of each piezoelectrically actuated mirror deflects the piezoelectrically actuated mirror about a first axis and a second actuation arm of each piezoelectrically actuated mirror deflects the piezoelectrically actuated mirror about a second axis.

13. The optical routing device of claim 9, wherein a first actuation arm of each piezoelectrically actuated mirror has a first length for deflecting the piezoelectrically actuated mirror about a first axis and a second length oriented substantially perpendicular to the first length for deflecting the piezoelectrically actuated mirror about a second axis.

14. The optical routing device of claim 13, wherein the first and second electrodes are formed along the first and second length of the first actuation arm, a third electrode is formed on the second length of the first actuation arm, and wherein a surface area of the third electrode over the second length is greater than a surface area of the second electrode over the second length.

15. An optical routing device, comprising:

an organic substrate;

an array of cavities formed into the organic substrate;

an array of piezoelectrically actuated mirrors anchored to the organic substrate, wherein each of the piezoelectrically actuated mirrors extends over a cavity;

a routing die mounted on the organic substrate, wherein the routing die is electrically coupled to each of the piezoelectrically actuated mirrors and is configured to generated a voltage across a first and a second electrode of each piezoelectrically actuated mirror;

a photodetector electrically coupled to the routing die, wherein the photodetector converts an optical signal into an electrical signal; and an array of fiber optic cables, wherein each of the fiber cables is optically coupled with one of the piezoelectrically actuated mirrors, and wherein each fiber optic cable includes an optical splitter that is optically coupled with the photodetector.

16. The optical routing device of claim 15, wherein the array of piezoelectrically actuated mirrors is a two dimensional array.

17. The optical routing device of claim 15, wherein each of the piezoelectrically actuated mirrors comprises:

a first electrode;

a piezoelectric layer formed on the first electrode;

a second electrode formed on the piezoelectric layer; and a reflective surface formed on a top surface of the piezoelectrically actuated mirror.

18. The optical routing device of claim 17, wherein each of the piezoelectrically actuated mirrors include one or more actuation arms, and wherein each of the piezoelectrically actuated mirrors is anchored to the organic substrate by the one or more actuation arms.

19. The optical routing device of claim 18, wherein a first actuation arm of each piezoelectrically actuated mirror deflects the piezoelectrically actuated mirror about a first axis and a second actuation arm of each piezoelectrically actuated mirror deflects the piezoelectrically actuated mirror about a second axis.

\* \* \* \* \*